Patented Oct. 21, 1930

1,778,784

UNITED STATES PATENT OFFICE

CURT RÄTH, OF BERLIN, GERMANY, ASSIGNOR TO SCHERING-KAHLBAUM AKTIEN-GESELLSCHAFT, OF BERLIN, GERMANY

MAKING HYDROXY COMPOUNDS OF PYRIDINE

No Drawing. Application filed April 10, 1928, Serial No. 269,026, and in Germany April 14, 1927.

This invention relates to a method for making hydroxy compounds of pyridine and consists in treating halopyridine or halopyridines having further non saponifiable substituents, with acid reacting saponifying agents such as aqueous hydrohalic acids especially aqueous hydrochloric acid. The treatment of the starting material with the acid reacting saponifying agent is preferably carried out at raised temperatures up to about 350° C. The reaction may be carried through in presence or absence of organic solvents or diluting agents. Halopyridines, in which the halogen is in the 2-position are especially suitable as starting materials; they may have further non saponifiable substituents such as halogen, the hydroxy group, the amino group, the nitro group, the arsonic acid group, an alkyl or an aryl group, especially in the 3- or 5-position.

Examples 1. 60 g. of 2-chloro-5-nitropyridine are mixed with 200 ccm. of concentrated hydrochloric acid and heated in a bomb tube for about five hours to about 150° C. The reaction product is diluted with about 100 ccm. of water, thus precipitating crystals of 2-hydroxy-5-nitropyridine. By recrystallization with water a pure product melting at 184° C. is obtained. The yield is nearly quantitative.

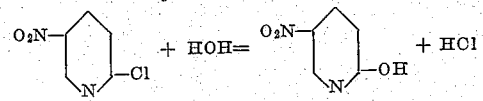

2. 55 g. of 2-chloropyridine mixed with 220 ccm. of concentrated hydrochloric acid are treated in the same manner as in Example 1 the 2-chloro-5-nitropyridine. The yield of 2-hydroxypyridine is quantitative.

3. 73 g. of 2-5-dichloropyridine and 200 ccm. of concentrated hydrochloric acid are heated under pressure for about five hours to about 150° C. The dark-brown reaction product is diluted with 500 ccm. of water. A crystalline mass of faintly yellow 2-hydroxy-5-chloropyridine, melting at 163° C. falls out. The yield is 91% of the theory.

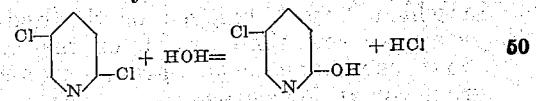

4. 20 g. of 2-chloro-3-chloro-5-nitropyridine and 100 ccm. of concentrated hydrochloric acid are boiled for two hours in a vessel with reflux condenser. The reaction product is diluted with water and steam distilled. The crystals of 2-hydroxy-3-chloro-5-nitropyridine obtained melt at 198° C. Yield 86% of the theory.

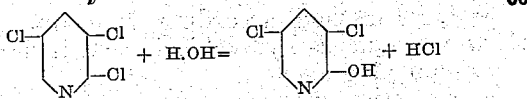

I claim:
1. A method for making 2-hydroxy compounds of pyridine which consists in treating with aqueous hydrolhalic acids pyridine compounds of the general formula

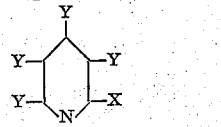

in which X is a halogen and Y hydrogen or a halogen or the hydroxy group or the nitro group, or the amino group, or the arsonic acid group or an alkyl group or an aryl group.

2. A method for making 2-hydroxy compounds of pyridine which consists in treating with aqueous hydrolhalic acids pyridine compounds of the general formula

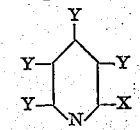

in which X is chlorine and Y hydrogen or a halogen or the hydroxy group, or the nitro group, or the amino group, or the arsonic acid group or an alkyl group or an aryl group.

3. A method for making 2-hydroxy compounds of pyridine which consists in treating with aqueous hydrolhalic acids pyridine compounds of the general formula

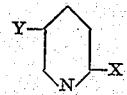

in which X is a halogen and Y a halogen or the hydroxy group, or the nitro group, or the amino group, or the arsonic acid group or an alkyl group or an aryl group.

4. A method for making 2-hydroxy compounds of pyridine which consists in treating with aqueous hydrolhalic acids pyridine compounds of the general formula

in which Y is a halogen or the hydroxy group, or the nitro group, or the amino group, or the arsonic acid group, or an alkyl group, or an aryl group.

5. A method for making 2-hydroxy-5-nitropyridine which consists in treating 2-halogeno-5-nitropyridine with aqueous hydrohalic acids.

6. A method for making 2-hydroxy-5-nitropyridine which consists in treating 2-chloro-5-nitropyridine with aqueous hydrohalic acids.

7. A method according to claim 1 in which aqueous hydrochloric acid is used as saponifying agent.

In testimony whereof I affix my signature.

CURT RÄTH.